(12) United States Patent
Thomasset (10) Patent No.: US 8,246,890 B2
(45) Date of Patent: Aug. 21, 2012

(54) MULTILAYER ARTICLES AND THEIR PRODUCTION METHOD

(75) Inventor: Jacques Thomasset, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 1156 days.

(21) Appl. No.: 11/990,506

(22) PCT Filed: Aug. 17, 2006

(86) PCT No.: PCT/IB2006/052838

§ 371 (c)(1), (2), (4) Date: Apr. 22, 2008

(87) PCT Pub. No.: WO2007/023428

PCT Pub. Date: Mar. 1, 2007

(65) Prior Publication Data

US 2008/0284058 A1   Nov. 20, 2008

(30) Foreign Application Priority Data

Aug. 22, 2005 (EP) .................................... 05107677

(51) Int. Cl.
*B29C 59/02* (2006.01)
(52) U.S. Cl. ..................................................... 264/320
(58) Field of Classification Search ................... 264/320
See application file for complete search history.

(56) References Cited

FOREIGN PATENT DOCUMENTS

| JP | 02098415 A | * | 4/1990 |
|----|------------|---|--------|
| JP | 03 234604 | | 10/1991 |
| JP | 2003-039531 | | 2/2003 |
| JP | 2003 039531 | | 2/2003 |
| JP | 2005-125532 | | 5/2005 |

OTHER PUBLICATIONS

English Translation of Written Opinion of the International Searching Authority.
International Search Report for PCT/IB2006/05838 dated Feb. 14, 2007.
Database WPI, Section Ch, Week 200538, Derwent Publications Ltd., London, GB, AN 2005-355785 XP002366018.

* cited by examiner

*Primary Examiner* — Larry Thrower
(74) *Attorney, Agent, or Firm* — Nixon & Vanderhye P.C.

(57) ABSTRACT

Method of producing a multilayer article forming an axisymmetric body, said article comprising at least a base of diameter D joined to a side wall of average thickness T and of height H said method consisting in feeding a coextruded multilayer charge into the cavity of a mold then in compressing said charge in order to form the article, the charge forming a body axisymmetric about an axis of symmetry, the charge consisting of a radial stack of several layers of which at least one is a thin functional layer, the outer diameter of said charge being approximately equal to D, the direction of compression being parallel to the axis of symmetry of said charge, and the compression being carried out on one face of the charge, which method is characterized by the fact that the charge is compressed only on one portion of said face.

4 Claims, 7 Drawing Sheets

MULTILAYER ARTICLES AND THEIR PRODUCTION METHOD

This application is the U.S. national phase of International Application No. PCT/IB2006/052838 filed 17 Aug. 2006 which designated the U.S. and claims priority to European Application No. 05107677.6 filed 22 Aug. 2005, the entire contents of each of which are hereby incorporated by reference.

FIELD OF THE INVENTION

The present invention relates to a method of producing multilayer articles by compression moulding of a coextruded charge of synthetic resin.

DESCRIPTION OF THE PRIOR ART

Japanese Patent JP 2 098 415 proposes producing a multilayer article by compression moulding of a cylindrical multilayer charge consisting of a radial stack of several synthetic resin layers. The compression moulding of this charge, along a direction parallel to its axis of symmetry and creating a radial flow of the charge, leads to an article having a multilayer structure. According to the method disclosed in Patent JP 2 098 415, squashing this charge and leads to multilayer articles as illustrated in FIG. 3.

Figure 1:
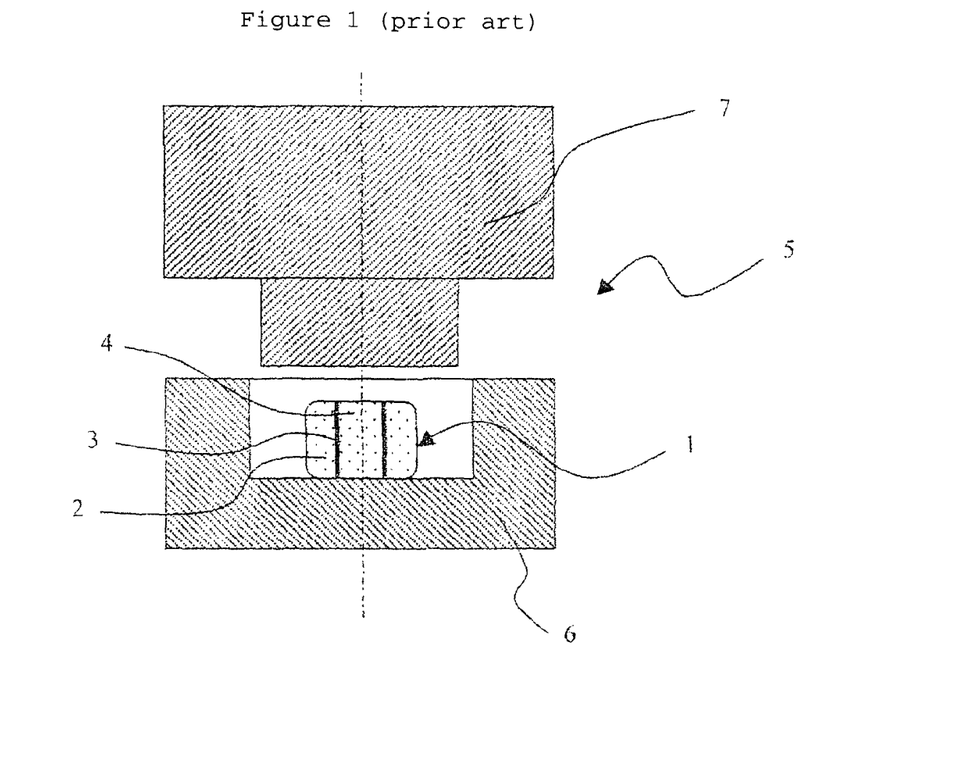
FIG. 1 illustrates the first step of the method of producing multilayer articles according to the Patent JP 2 098 415, a step consisting in feeding a multilayer charge into the cavity of a mould.
Figure 2:
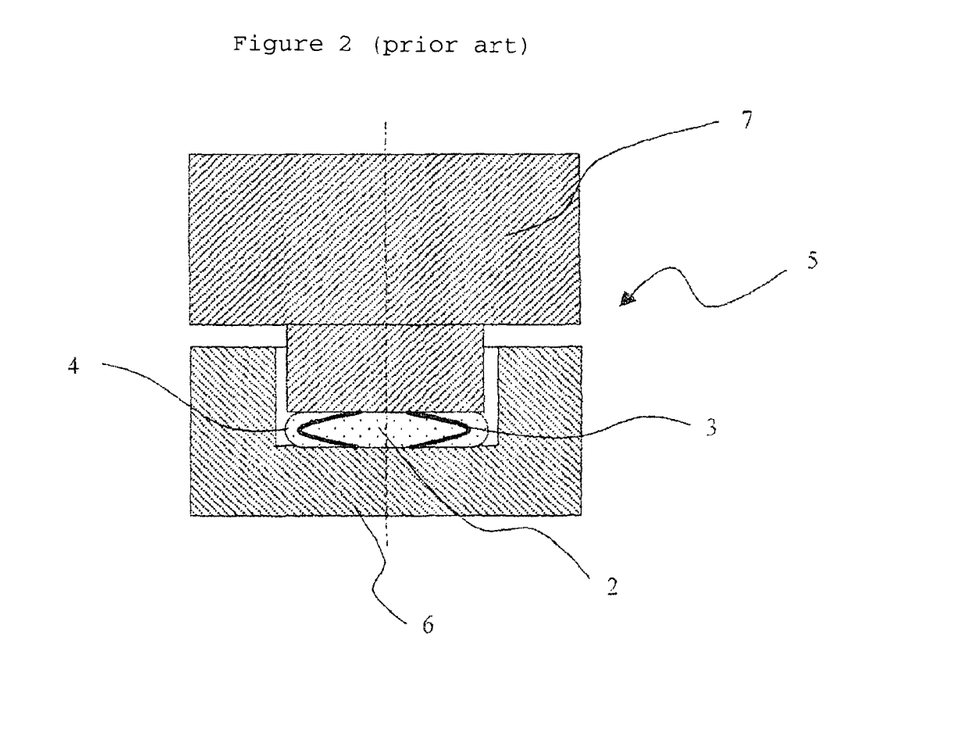
FIG. 2 shows the second step of the method of producing multilayer articles according to the Patent JP 2 098 415, a step consisting in compressing the charge in the mould in order to create a radial flow of the charge.

It is proposed in Patent JP 2 098 415 to use a triple-layer charge illustrated in FIG. 1, this charge being made up of a first resin 4 forming the central portion of the charge, a second resin 3 covering only the side faces of the first resin, and a third resin 2 covering only the side faces of the second resin. This charge is positioned in a compression mould 5 comprising a die 6 and a punch 7. Squashing this composite charge in the mould 5 along its axis of symmetry is illustrated in FIG. 2. Squashing creates a radial flow of the charge.

Figure 3:
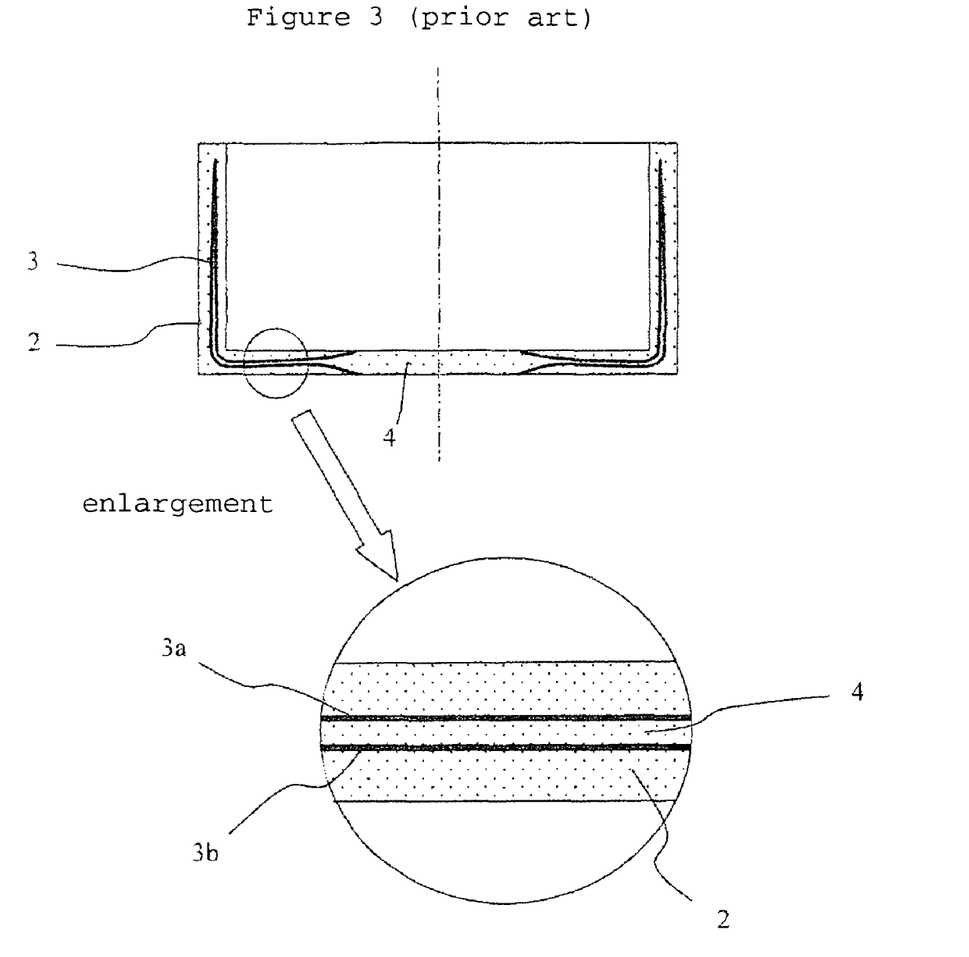
FIG. 3 illustrates the multilayer article obtained according to the method disclosed in Patent JP 2 098 415. This article comprises a thin functional resin layer 3 embedded between two resin layers 2 and 4 forming the article.

The multilayer article obtained according to the method disclosed in Patent JP 2 098 415 is illustrated in FIG. 3. The multilayer structure obtained is characterized by the double functional layer 3 embedded in the thickness of the article; said layer 3 forming a fold and having two free ends. The multilayer packaging produced according to the invention disclosed in Patent JP 2 098 415 has numerous advantages, in particular when the functional layer is an oxygen barrier layer which makes it possible to improve the preservation of food contained in the packaging. However, by applying the method disclosed in Patent JP 2 098 415, a double functional layer 3 is obtained approximately centred in the thickness of the article. Now, it would be convenient for a functional layer to be close to the inner wall. Such a configuration would have the advantage of reducing the quantity of molecules that migrate from the packaged product into the wall of the packaging, or from the wall of the packaging into the packaged product. The method disclosed in Patent JP 2 098 415 does not allow the position of the functional layer in the thickness of the part to be changed.

There is thus a need to be able to solve the above problems.

SUBJECT OF THE INVENTION

As will subsequently be seen, the present invention aims to change the position of the functional layer in the thickness of the part, to place it at a distance closer to the inner wall than the outer wall of the article.

SUMMARY OF THE INVENTION

The invention consists of a method of producing a multilayer article forming an axisymmetric body, said article comprising at least a base of diameter D joined to a side wall of thickness T and of height H. The method consists in feeding a coextruded multilayer charge into the cavity of a mould then in compressing said charge in order to form the article; the direction of compression being parallel to the axis of symmetry of said charge and the compression applies to one face of the charge. The charge forms a body axisymmetric about an axis of symmetry and consists of a radial stack of several layers of which at least one is a thin functional layer. The outer diameter of said charge being approximately equal to D. The method is characterized by the fact that the charge is compressed only on one portion of said face.

The invention also consists in producing multilayer articles by compression moulding of a charge of diameter D consisting of a radial stack of several layers of which at least one is a thin functional layer and in positioning, due to the invention, the functional layer close to the inner wall of the packaging. The multilayer charge is fed into a mould and compressed in the direction of the axis of symmetry of the charge. Centring the charge in the mould is important for obtaining a correct distribution of layers over the whole periphery of the article. Advantageously the charge is not compressed over the whole of its surface but only over one central portion of the charge, the diameter of said central portion being less than D.

According to a preferential mode of the invention, a multilayer charge of diameter equal to D is fed into the cavity of a mould; the diameter of the charge being close to the diameter of the mould cavity; the diameter of the charge being preferably slightly smaller than the diameter of said mould cavity. The multilayer charge is compressed over a surface approximately equal to (D−2T), T being equal to the thickness of the moulded part. According to this preferential mode of the invention, the charge mainly flows in the direction of compression and not radially. According to this preferential embodiment, the functional layer is positioned radially in the charge at a distance of preferably between $$\frac{D-2T}{6} \text{ and } \frac{D-2T}{2}.$$

It has been observed that the multilayer packaging produced in accordance with the previously described method has a functional layer very close to the inner wall of the packaging. This packaging is particularly advantageous when the functional layer is a barrier layer. The smaller distance $$\frac{D-2T}{6}$$

mentioned above constitutes a limit allowing the functional layer to be properly kept within the wall of the packaging.

The invention is particularly advantageous for producing articles whose height H is greater than D. For such articles where the height H is large enough compared to said diameter D, some particularly interesting properties are obtained, which are linked to the fact that the functional layer lies close to the inner wall of said article and that only a small portion of the wall of said article does not have a multilayer structure.

The invention will be better understood hereinafter by means of a detailed description of the examples illustrated by the figures below.

BRIEF DESCRIPTION OF THE FIGURES

FIGS. 1 to 3 illustrate a method of producing multilayer articles according to the most recent prior art.

FIGS. 4 to 6 illustrate the method of producing multilayer articles according to the invention.

DETAILED DESCRIPTION OF THE FIGURES

The invention relates to a method of producing multilayer articles by compression moulding of a multilayer charge.

The multilayer charge is formed by radially superimposing several resins and has a cylindrical geometry of diameter D. The invention is intended, but not in an exclusive way, for the production of multilayer packaging having improved gas and aroma barrier properties. For this reason, the multilayer charge preferentially comprises a thin functional layer chosen for its barrier properties. This functional layer flows during the method of producing the article and spreads out inside the wall of the article. The thin functional resin layer is therefore embedded in the charge between the resin layers intended for forming the wall of the article. The functional layer is often combined with two thin adhesive resin layers placed on both sides of the functional layer in order to improve the adhesion between the layers. The adhesive layers will not be mentioned in the remainder of the invention document so as not to increase the presentation of the invention. In the same sense, the invention document is produced with a charge comprising only two resins, but charges comprising a greater number of resins and of layers may easily be produced, which constitutes a significant advantage relative to existing products.

Figure 4:
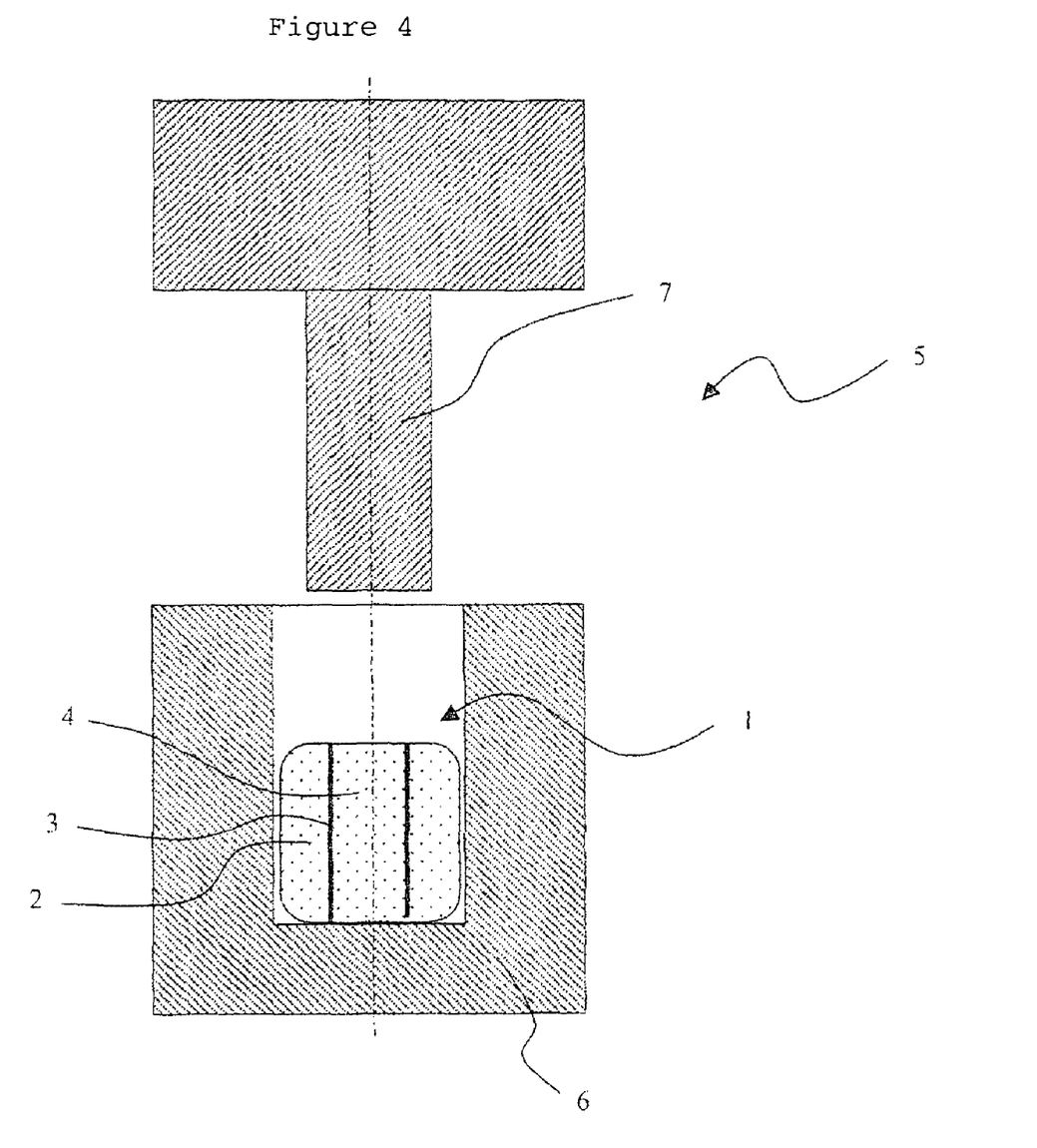
FIG. 4 shows the feeding of the multilayer charge into the mould cavity, the diameter D of the charge being approximately equal to the diameter of the mould cavity.

The multilayer charge being used in the explanation of the invention is illustrated in FIG. 4. This charge 1 of cylindrical geometry comprises a first resin forming the layers 2 and 4 and constituting at least 80% of the charge volume, and a thin functional layer 3 located at a distance R from the axis of symmetry of the charge. It has been found by experimentation that the functional layer is better spread in the article when R is between $$\frac{D-2T}{6} \text{ and } \frac{D-2T}{2};$$

T being the average thickness of the article produced. This aspect of the invention will be returned to in more detail further on in the document.

The multilayer charge 1 is manufactured by coextrusion of a rod. Preferably said rod is extruded at a constant rate and regularly cut in order to form a succession of multilayer charges. Since the methods and devices enabling the charges to be manufactured are described in the prior art, only the principle of manufacturing the charge is presented. The multilayer charge 1 may also be obtained by batch coextrusion in order to form each charge separately.

The multilayer charge is fed into the cavity of a mould 5, said mould 5 comprising at least two parts, a first part 6, called the die, which receives the charge; and a second part 7, called the punch, which in its movement compresses the charge. The charge is deposited in the mould so that the axis of symmetry of the charge is aligned with the axis of symmetry of the mould cavity. A first part of the invention consists in producing a charge of diameter D close to the diameter of the mould cavity as illustrated in FIG. 4. The moulding device shown in FIG. 4 and the following figures is a schematic representation being used only to explain the invention. The moulding devices required to produce articles according to the invention are known and will therefore not fall within the scope of this document. The cavity formed by the die 6 is not necessarily cylindrical as is shown in FIG. 4, but the wall of said cavity may form an angle with the axis of symmetry, which may be a clearance angle of around 3° allowing the article to be demoulded, or a larger angle if the article is conical. Within the scope of the invention the tapering of articles produced is generally less than 10°, the cone angle being defined relative to the axis of symmetry.

Figure 5:
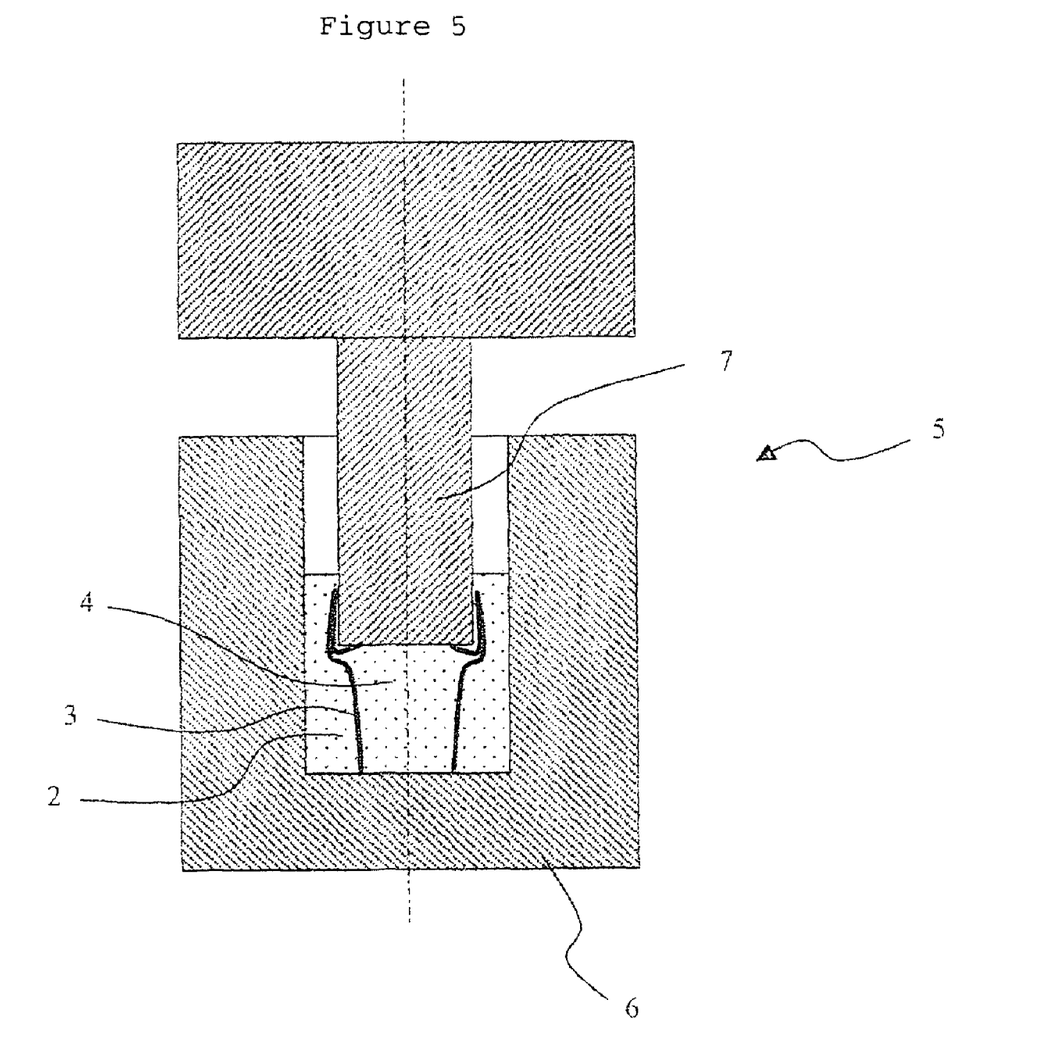
FIG. 5 shows the compression of the charge according to the method, the compression of the charge occurring only over the central portion, the compression of the charge creating a flow in the compression direction.

The charge 1 is then compressed in the mould following a direction parallel to the axis of symmetry. Contrary to that which is described in the prior art, and in particular in Patent JP 2 098 415, the charge is compressed only over its central portion; the diameter of said central portion being approximately equal to (D−2T). FIG. 5 shows the descent of the punch 7 that compresses the central portion of the upper layer of the charge 1. The movement of the punch 7 creates a deformation of the charge and a flow of the uncompressed portion of the charge. The functional layer forms a fold and flows along the wall of the punch 7 while remaining completely embedded between the layers 4 and 2. The flow of the functional layer 3 along the wall of the punch that was observed during the tests was completely unexpected. This flow appears under specific conditions described within the scope of this invention.

The invention also relates to multilayer articles obtained due to the method of the invention.

Figure 6:
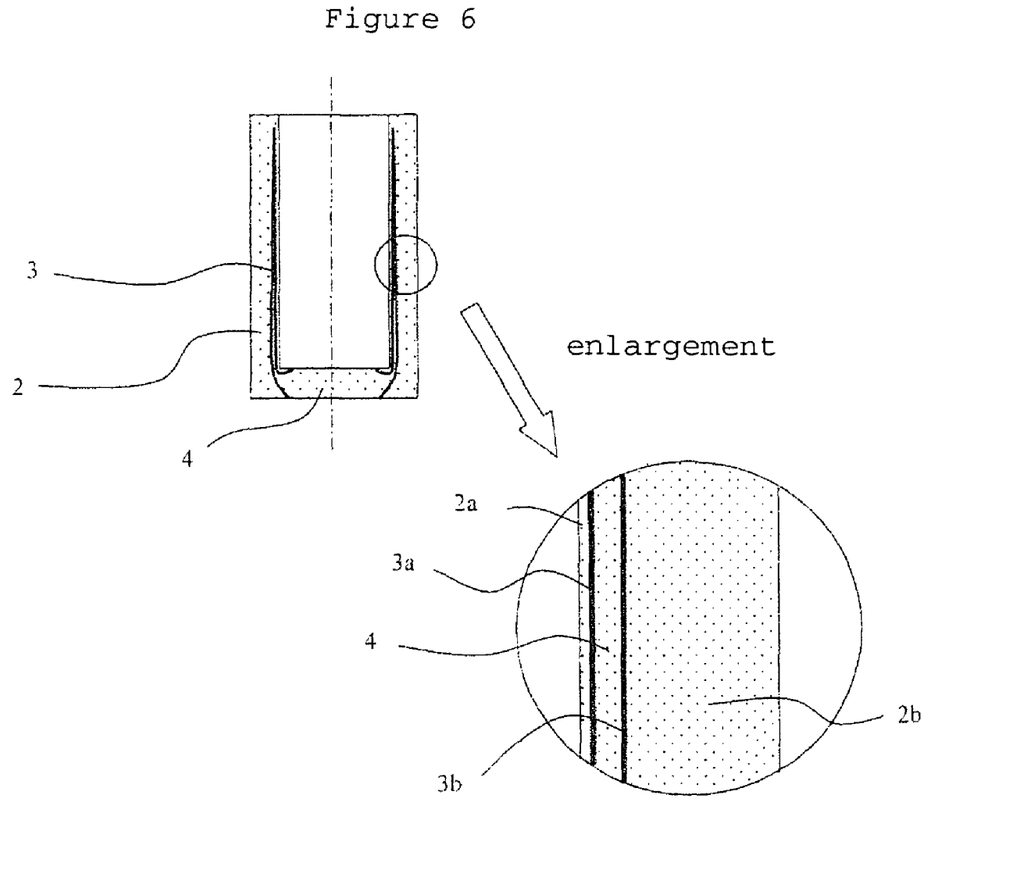
FIG. 6 illustrates the multilayer article obtained according to the method of the invention. This article comprises a thin functional resin layer 3 embedded between two resin layers 2 and 4 forming the article, the functional resin layer 3 lying in proximity to the inner wall of the article.

FIG. 6 shows the multilayer article that is obtained. This article comprises a functional layer 3 forming a double layer embedded between the layers 4 and 2 forming the wall of the article. The functional layer forms a fold level with the upper end of the article and has two free ends located level with the base of said article. The multilayer article obtained has a double functional layer close to the inner wall of said article. FIG. 6 shows the functional layer 3 forming a double layer 3a and 3b; layer 3a being separated from the inner wall of the packaging by layer 2a; layer 4 separating layers 3a and 3b; and layer 2b separating layer 3 from the outer wall of the packaging. The first functional layer 3a lies at a distance from the inner wall of the article of less than T/6 and the second functional layer 3b at a distance of less than 2T/3 and generally less than T/3. The invention makes it possible to reduce, by at least 30%, the number of molecules that migrate from the wall of the packaging into the packaged product, or the molecules that migrate from the packaged product into the wall of the packaging, relative to an article of the prior art obtained according to Patent JP 2 098 415.

The articles produced according to the invention have particularly advantageous properties when their height H is greater than or equal to D. In fact, for articles having a height H greater than D, the functional layer forms a barrier spread into at least 80% of the article, which allows an appreciable improvement in the impermeability of said article.

The radial position of the functional layer in the charge has a great influence on the distribution of said functional layer within the article. Thus, it has been observed that if the functional layer is positioned in the charge at a radius R of less than $$\frac{D-2T}{6},$$

the functional layer only spreads partially within the side wall of the article. More specifically, the functional layer is found to be missing from the end of the side wall of the article. In the majority of cases, it is desirable that the functional layer spreads up to the end of the article, but there are some articles where the barrier properties are only required over one portion alone of the side wall of the article and for which the barrier layer may be positioned at a distance of less than $$\frac{D-2T}{6}.$$

It has also been observed that the radial position of the functional layer in the charge must not be greater than $$\frac{D-2T}{2}$$

so that the functional layer remains embedded in the wall of the article. When the radial position of the functional layer is greater than $$\frac{D-2T}{2},$$

the functional layer is found in places on the surface of the side wall of the article. In most cases, it is desirable to keep the functional layer embedded, especially when the functional layer is moisture-sensitive.

Figure 7:
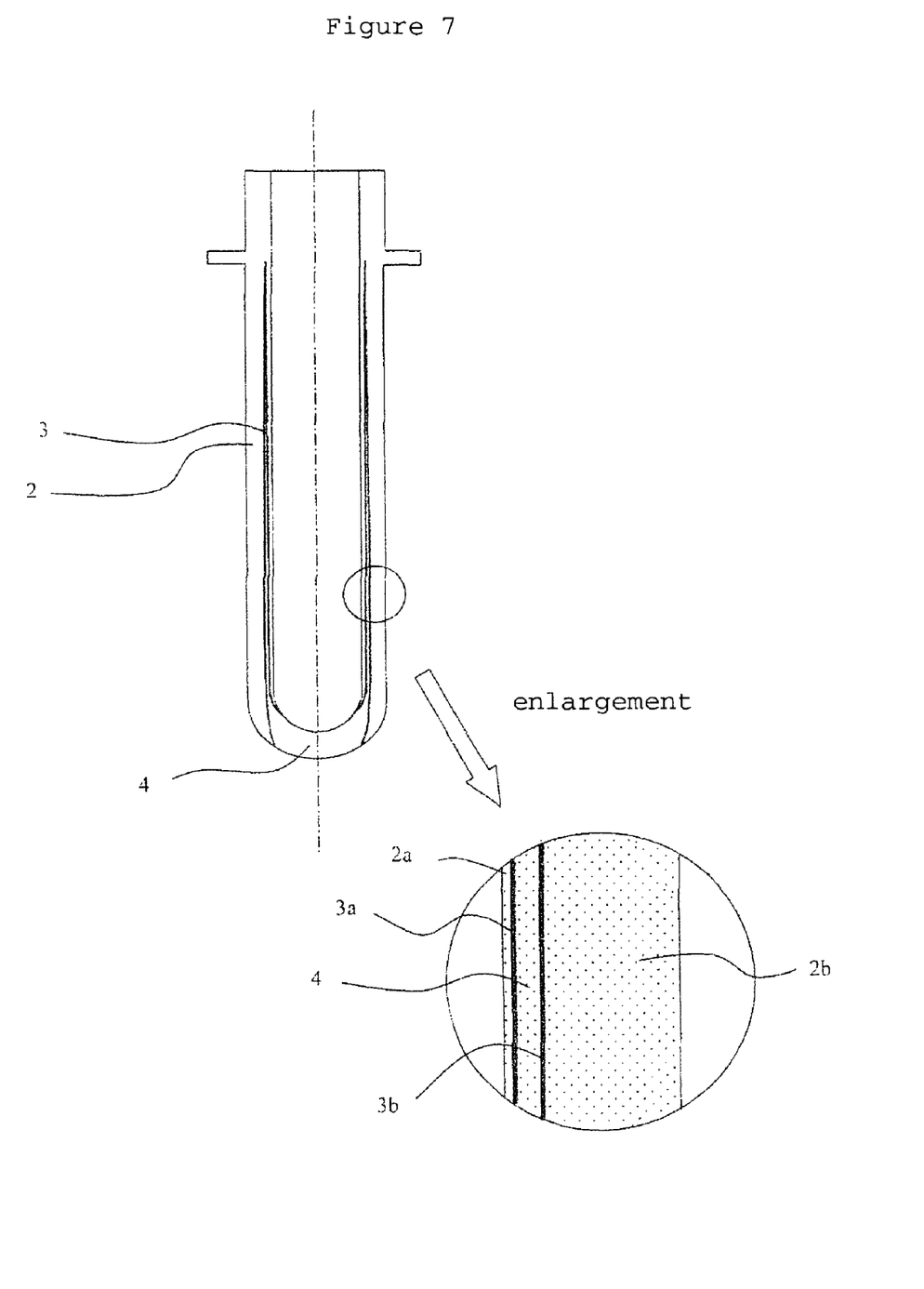
FIG. 7 illustrates a multilayer preform for the production of hollow bodies by biaxial stretch blow moulding, said preform produced according to the invention having a functional resin layer 3 close to its inner wall.

The method is of great advantage in producing multilayer preforms intended for forming hollow bodies by biaxial blow moulding. FIG. 7 illustrates a multilayer preform obtained according to the method of the invention. This preform has a thin functional layer 3 forming a double protection 3a and 3b at the level of the side walls. The functional layer 3 is embedded in the main resin 2 forming the wall of the preform, and said functional layer 3 has two free ends at base level and also a fold under the neck. The functional layer 3 forms two layers 3a and 3b at the level of the side walls; said layers 3a and 3b being located close to the inner wall of the preform. The layers 3a and 3b are located respectively at distances of less than T/6 and T/3 from the inner wall of the preform, T being the thickness of the wall of the preform at the location considered. The functional layer 3 is spread throughout the entire preform except at base and neck level. The percentage of functional layer in this article is less than 2%. By way of example, the invention allows PET or PP preforms to be produced with PAMXD6 or EVOH functional layers. Adhesive resin layers may be added to both sides of the functional layer.

The hollow body forming packaging is obtained by blow moulding in a mould of the preform shown in FIG. 7. This hollow body comprising a base, a neck and a side wall joining the base to the neck is particularly advantageous as it has improved barrier properties. More than 90% of the wall of said hollow body has an impermeability improved by the functional layer. The functional layer forming a double protection is found in proximity to the inner wall of said hollow body, which considerably limits the migration of molecules from the wall of the hollow body into the contents; or from the contents into the wall of the hollow body. The functional layer is embedded in the main resin forming the wall of said hollow body, and said functional layer has two free ends at base level and also a fold under the neck. The functional layer forms two layers at the level of the side walls; said layers being located close to the inner wall of the hollow body. The functional layers are located respectively at distances of less than F/6 and F/3 from the inner wall of the hollow body, F being the thickness of the wall of the hollow body at the location considered. The functional layer is spread throughout the entire hollow body except at base and neck level. The percentage of functional layer in this hollow body is less than 2%. The migration of molecules from the wall of the hollow body into the packaged product, or the migration of molecules from the packaged product into the wall of the hollow body is reduced by at least 50% relative to the prior art.

The invention makes it possible to produce multilayer hollow bodies having improved properties. The invention makes it possible to produce multilayer articles having very thin layers and having a large number of layers. This result may be obtained by a continuous coextrusion process in order to form the charge. This continuous coextrusion process makes it possible to obtain very thin layers and large numbers of layers contrary to batch processes like the multilayer injection moulding process currently used.

Figure 8:
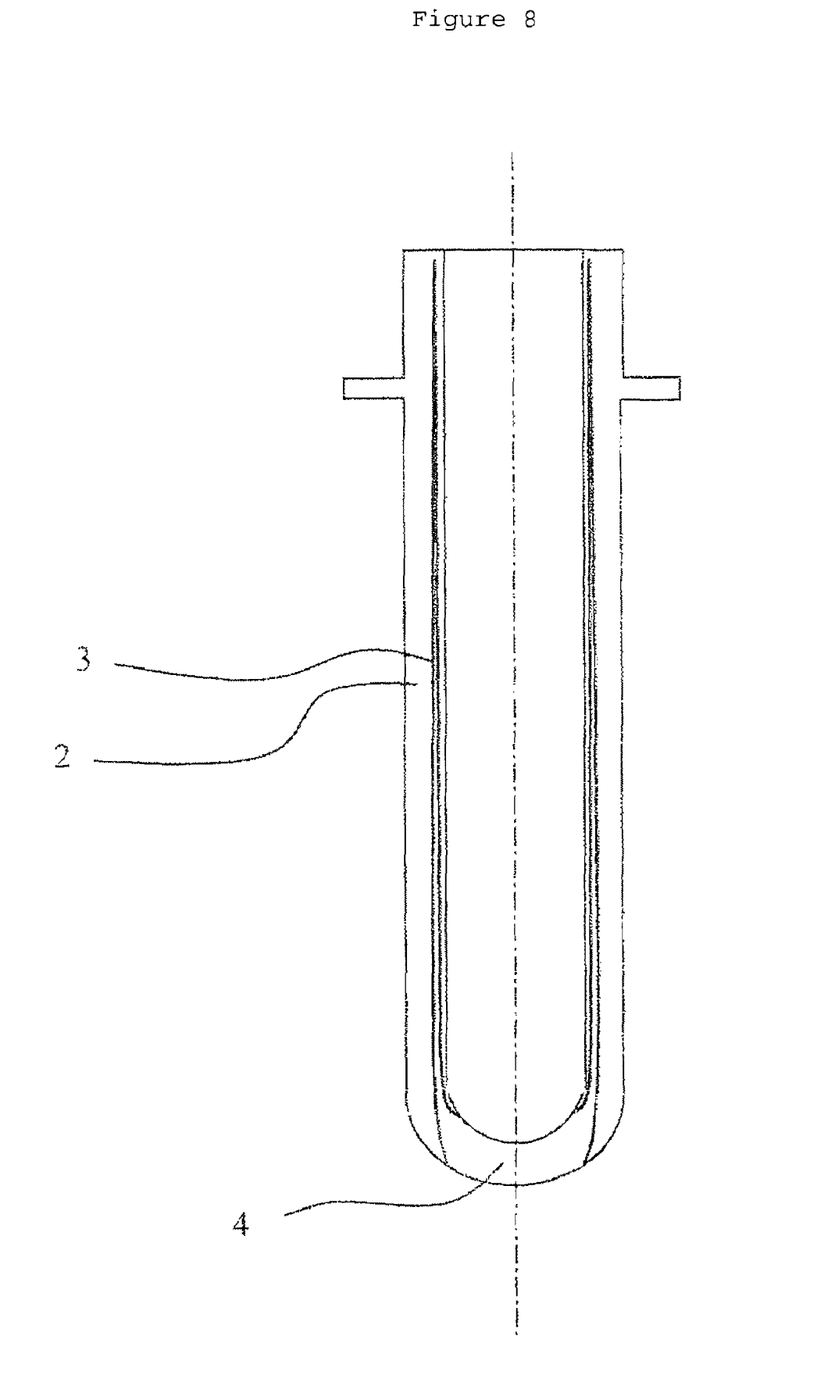
FIG. 8 shows a multilayer preform for the production of hollow bodies by biaxial stretch blow moulding, said preform being distinguished from the preform introduced in FIG. 7 by the fact that the functional layer 3 is also present in the neck.

FIG. 8 illustrates the possibility of spreading the functional layer 3 into the neck of the preform without weakening the mechanical properties of said neck. In fact, the invention makes it possible to add adhesive layers to each side of the barrier layer and to extrude these layers with a thickness that is sufficiently thin so that the set of three layers forming the functional layer represents less than 2% of the volume of the article. The improvement in the adhesion between the layers, combined with the low thickness of the layers, allows these layers to spread into the neck of the preform without weakening the mechanical properties of said neck.

The hollow body obtained by blow moulding in a mould of the preform represented in FIG. 8 comprises a base, a neck and a side wall joining the base and the neck. This hollow body is particularly advantageous since it has improved barrier properties. More than 90% of the wall of said hollow body has an impermeability improved by the functional layer. The functional layer forming a double protection is found in proximity to the inner wall of said hollow body, which considerably limits the migration of molecules from the wall of the hollow body into the contents; or from the contents into the wall of the hollow body. The functional layer forms two layers at the level of the side walls and of the neck; said layers being located close to the inner wall of the hollow body. The functional layers are located respectively at distances of less than F/6 and F/3 from the inner wall of the hollow body, F being the thickness of the wall of the hollow body at the location considered. The functional layer is spread throughout the entire hollow body except at base level. The functional layer represents less than 2% of the resin required to form the hollow body. The migration of molecules from the wall of the packaging into the packaged product or the migration of molecules from the packaged product into the wall of the packaging is reduced by at least 50%.

The molecules that migrate from the wall of the packaging into the packaged product are molecules of low mass resulting from the method of producing the resins or resulting from the decomposition of the resin during the processing method. By way of example, these molecules may be monomers, plasticizers, adjuvants or acetaldehyde molecules in the case of PET. Also by way of example, the molecules migrating from the packaged product into the wall of the packaging may be aromas, colorants, adjuvants, stabilizers, preservatives or flavour enhancers.

The resins used within the scope of the invention correspond to the thermoplastic resins routinely used, and more particularly those used in the packaging industry. Among the barrier resins that may be used to form the functional layer 3, mention may be made of the ethylene/vinyl alcohol copolymers (EVOH), polyamides such as Nylon-MXD6, acrylonitrile/methyl acrylate copolymers (BAREX) and fluoropolymers such as PVDF. Mention may also be made of some resins which may be used to form structure 2 of the article: polyethylene (PE), polypropylene (PP), polysytrene (PS), polyamide (PA) and polyester (PET). This list is not exhaustive. When choosing the resins, it is important to select products with similar viscosities. In general, it is preferable to use resins that, at the operating temperature, have a viscosity ratio of less than 10, and preferably a viscosity ratio of less than 3 will be chosen.

The compression moulding method consists in feeding a multilayer charge of synthetic resins in the melt state into the cavity of a mould; in forming the article by the compression moulding of said charge in the cavity of said mould; in cooling said article then in demoulding it.

In the examples presented here, the charges and the articles are of simple geometry, but it goes without saying that the invention relates to various charge and article geometries. By way of example, a charge having an orifice may be used to form an article having an opening at base level.

The articles obtained according to the invention incorporate a functional layer 3 forming at least one fold level with the periphery of the article. Articles also incorporating a second fold close to the axis of symmetry of the article may be obtained. An arrangement of the functional layer in the shape of a zigzag may be obtained in the article.

Charges comprising several functional layers 3 may also be used, said functional layers being all centred on the axis of symmetry of said charge. The multilayer articles obtained are characterized by the fact that the functional layers are superimposed at least partly, and each form at least one fold.

The invention claimed is:

1. Method of producing a multilayer article forming an axisymmetric body, said article comprising at least a base of diameter D joined to a side wall of average thickness T and of height H, said method consisting of feeding a coextruded multilayer charge into a cavity of a mould, then in compressing said charge in order to form the article, the charge forming a body axisymmetric about an axis of symmetry, the charge consisting of a radial stack of several layers of which at least one is a functional layer, the outer diameter of said charge being approximately equal to D and having a cylindrical geometry and a top surface and an opposite bottom surface connected to one another along the circumference of the charge, the direction of compression being parallel to the axis of symmetry of said charge, and the compression being carried out on the to surface of the charge, wherein the charge is compressed only on one central portion of the top surface, the central portion being smaller than the entire top surface, and wherein the diameter of the central portion of the charge is approximately equal to D−2T.

2. Method according to claim 1, wherein the central portion of the surface subjected to compression is centered about the axis of symmetry of the charge.

3. Method according to claim 1, wherein said functional layer is positioned radially at a distance from the axis of symmetry that is less than $$\frac{D-2T}{2}.$$

4. Method according to claim 1, wherein said functional layer is positioned radially at a distance from the axis of symmetry that is greater than $$\frac{D-2T}{6}.$$

* * * * *